E. STARR.
Cultivator.

No. 56,288.

Patented July 10, 1866.

Witnesses.

Inventor:
E. Starr
Per Munn & Co.
Attys

UNITED STATES PATENT OFFICE.

ESEN STARR, OF ROYAL OAK, MICHIGAN.

IMPROVEMENT IN CULTIVATORS.

Specification forming part of Letters Patent No. 56,288, dated July 10, 1866.

*To all whom it may concern:*

Be it known that I, ESEN STARR, of Royal Oak, Oakland county, State of Michigan, have invented a new and Improved Cultivator or Horse-Hoe; and I do hereby declare that the following is a full, clear, and exact description thereof, which will enable others skilled in the art to make and use the same, reference being had to the accompanying drawings, forming part of this specification, in which—

Figure 1:
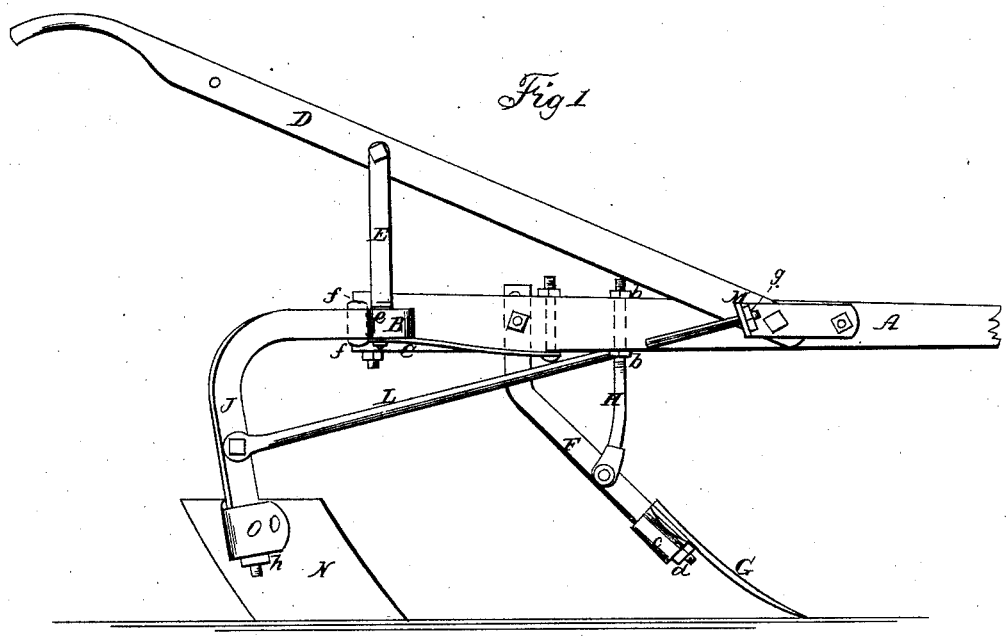
Figure 2:
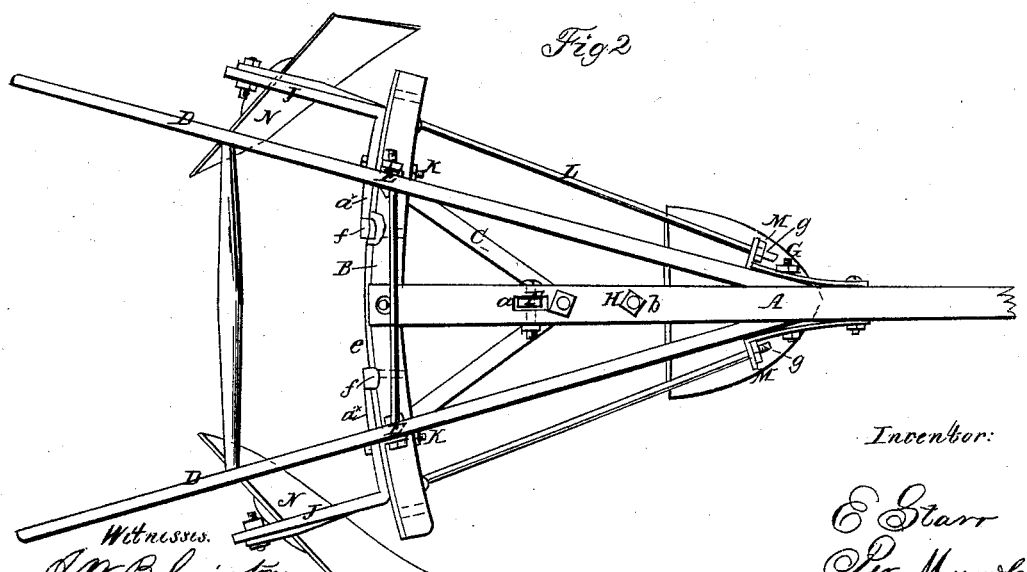

Figure 1 is a side view of my invention. Fig. 2 is a plan or top view of the same.

Similar letters of reference indicate like parts.

This invention relates to a new and improved cultivator or horse-hoe for cultivating crops which are grown in hills or drills, such as corn, potatoes, &c.

The invention consists in a peculiar construction of the implement, as hereinafter fully shown and described, whereby the same is rendered very strong and durable, and rendered capable of operating in the most perfect and efficient manner.

A represents the beam of the implement, to the rear end of which a segment-bar, B, is permanently attached and braced by a V-shaped bar, C, from the beam A.

D D are handles, the front ends of which are attached to the beam A, and supported near their centers from the rear segment-bar, B, by standards E E.

F represents a standard, to which the front share, G, of the implement is attached. This standard is pivoted at its upper end in a mortise, $a$, in the beam A, and said standard is curved or bent, as shown in Fig. 1, so that its lower part will have an inclined position of about forty-five degrees and its upper part have a vertical position.

The standard has a bar, H, attached to it, which passes up through the beam A, and has a screw-thread cut upon it, on which nuts $b\ b$ are fitted, one above and the other below the beam A. By adjusting these nuts $b\ b$ the standard F may be firmly braced in position.

The share G may be of the usual shovel form, and it has a socket, $c$, secured to its rear side, in which the lower end of the standard F is fitted and secured by a nut, $d$, on its lower end below the socket.

The rear side of the curved or segment bar B is faced with a metal plate, $e$, and to the rear side of the bar B the standards J J are attached. These standards are of curved form, as shown in Fig. 1, so that their lower ends will project out at some distance to the rear of bar B, and the upper ends of the standards J J are bent laterally inward or toward each other, as shown at $a^x$, and curved so as to fit snugly against the plate $e$ on the rear of the bar B, to which they are secured by a bolt, K, and by lips $f$, which project over the upper and lower surfaces of bar B. This bar B may have several bolt-holes through it, to admit of the standards J J being adjusted nearer together or farther apart, as may be desired.

The standards J J are braced by rods L L, the front ends of which pass through lips M attached to the beam, one at each side, and have nuts $g$ on their front ends.

By this arrangement it will be seen that the standards J J are firmly supported in position.

To the lower end of each standard J a share, N, is attached by means of a socket, O, the lower ends of the standards J passing through the sockets and having screw-nuts $h$ on their lower ends.

The plows or shares N may be adjusted at a greater or less distance apart by adjusting the bolts K in different holes in the bar B.

By this mode of construction or arrangement a very strong and durable implement is obtained, and one which will admit of the ready adjustment of the rear plows or shares to suit the width of the spaces between the rows of plants to be plowed.

Having thus described my invention, I claim as new, and desire to secure by Letters Patent—

1. The curved or segment bar B at the rear end of the beam A, in combination with the curved standards J J, provided with upper bent ends, $a^x$, to abut or fit snugly against the rear side of said bar B, and to which they are secured by bolts, substantially as shown and described.

2. The standard F, bent or curved, as shown, and secured in position by a brace rod or bar, H, from the beam A, substantially as and for the purpose specified.

ESEN STARR.

Witnesses:
REUBEN RUSSEL,
ALMON STARR.